Nov. 8, 1955     W. B. MILLIGAN ET AL     2,722,826
CONTINUOUS VAPOR PRESSURE RECORDER
Filed March 30, 1953     2 Sheets-Sheet 1

Inventors:
D. J. Pompeo
W. B. Milligan
F. B. Rolfson
By A. H. McCarthy
Their Agent

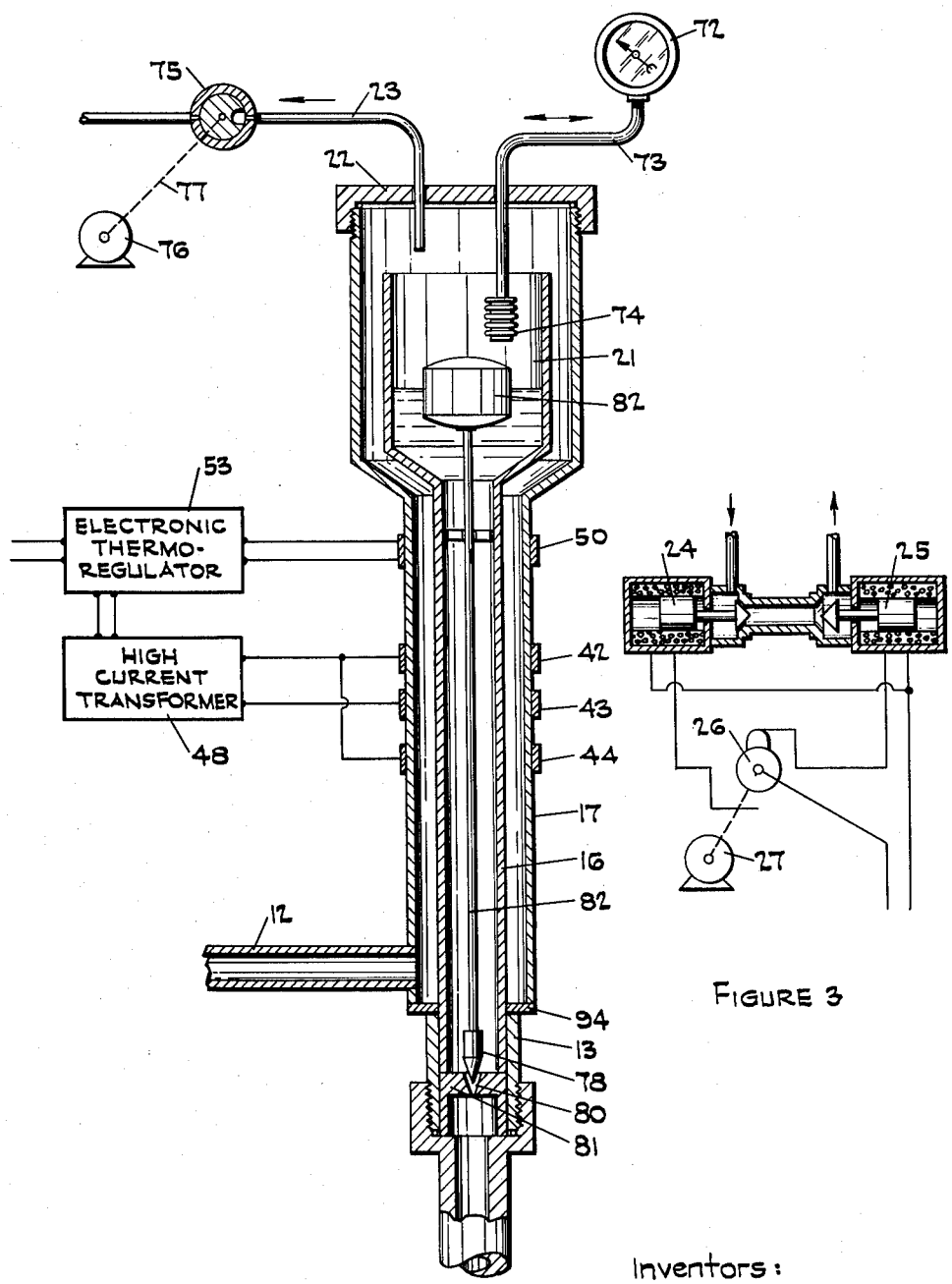

United States Patent Office 2,722,826
Patented Nov. 8, 1955

2,722,826

CONTINUOUS VAPOR PRESSURE RECORDER

William B. Milligan, Albany, Domenick J. Pompeo, Oakland, and Francis B. Rolfson, San Pablo, Calif., assignors to Shell Development Company, Emeryville, Calif., a corporation of Delaware Application March 30, 1953, Serial No. 345,428

7 Claims. (Cl. 73—53)

This invention relates to apparatus for testing liquid hydrocarbons and other volatile products and pertains more particularly to a device for continuously measuring and recording the vapor pressure of a fluid such as gasoline.

One of the several control tests that are regularly made in the refining of petroleum and the manufacture of gasoline and other volatile products is the vapor pressure test. For example, certain distillation columns in an oil refinery can be operated at their optimum rate if the vapor pressure of the liquid in the column at one or more points within the column is known. Gasoline is usually manufactured to predetermined specifications, one of which is a vapor pressure reading within certain minimum and maximum values. Normally, the gasoline is put in a blending tank and mixed with predetermined amounts of other constituents, such as butane, until the final mixture has an analysis and a vapor pressure within certain specified values. Thus, in order to obtain gasoline within the required specifications, it is often necessary to admix several portions of butane separately to a tank of gasoline and to analyze the mixture after each portion added thereto has been thoroughly mixed therein. This type of blending is both expensive and time consuming.

It is, therefore, a primary object of this invention to provide an apparatus for continuously measuring and recording the vapor pressure of a volatile product such as gasoline.

Another object of this invention is to provide a continuous vapor pressure apparatus for automatically controlling the throughput of a distillation column.

A further object of this invention is to provide a continuous vapor pressure apparatus for controlling the continuous blending of gasoline and other volatile products within a pipeline.

Another object of this invention is to provide a continuous vapor pressure apparatus provided with means for bleeding vapor from said apparatus at a controlled rate.

A further object of this invention is to provide a compact vapor apparatus of simple design which may be maintained at a constant temperature without the necessity of employing a constant temperature bath of large volume as used with presently-known equipment of this type.

These and other objects of this invention will be understood from the following description taken with reference to the drawing, wherein:

Figure 2 is a diagrammatic view, partly in cross section, illustrating alternative components which may be employed in the present apparatus for automatically measuring and recording the vapor pressure of a liquid.

Figure 3 is a view, partly in cross section, of an alternative type of valve arrangement for use in the bleed conduit 23 of Figure 1.

Figure 1:
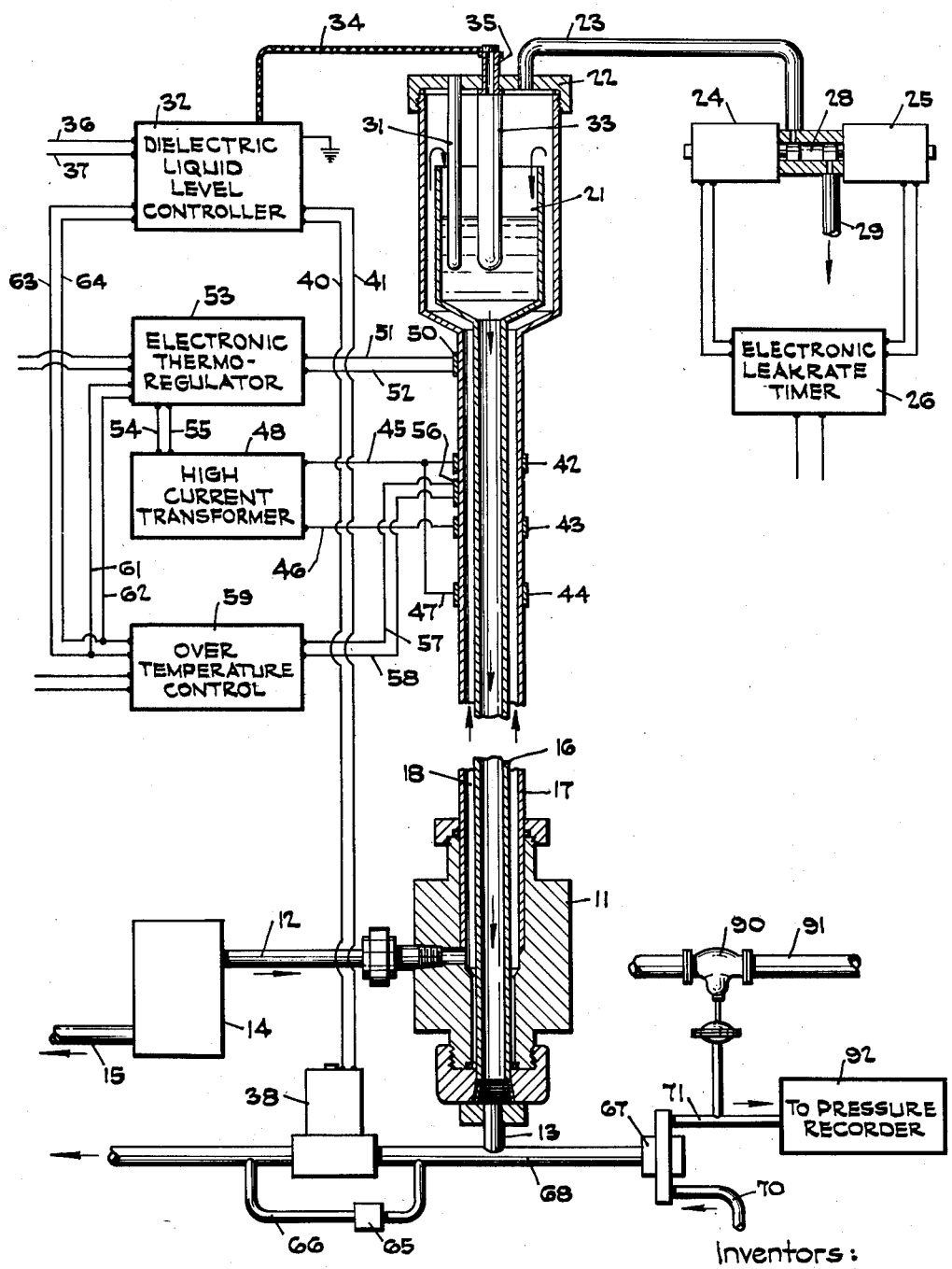
Figure 1 is a schematic diagram illustrating the principal component parts of the present continuous vapor pressure recorder.

Referring to Figure 1 of the drawing, the present vapor pressure apparatus comprises a housing or plug 11 having an inlet sample supply line 12 passing through one wall thereof, and a sample discharge or drain line 13 passing through the bottom or another wall of said housing. A constant flow of fluid is provided through said inlet line 12 to said housing 11 by means of a constant flow pump 14, such as a gear pump, or by means of any suitable flow controller means such, for example, as one of the constant differential pressure type. The pump or flow controller 14 is in turn connected by means of a conduit 15 to the pipe line tank or chamber (not shown) from which a fluid sample is being taken to determine its vapor pressure.

Vertically connected in a fluid tight manner in the plug 11 and extending upwardly therefrom are a pair of concentric tubes 16 and 17 which are preferably made with thin walls and of a material having a low heat conductivity. The outside diameter of the inner tube 16 is substantially smaller than the inside diameter of the outer tube 17 whereby an annular space 18 is formed which is in communication with the inlet supply line 12, while the bore of the inner tube 16 is in communication with the drain line 13. Both the inner and outer tubes 16 and 17, respectively, are preferably enlarged at their upper end thereby forming a chamber 21 of substantial size. However, if large diameter tubes 16 and 17 are employed the upper ends thereof need not be enlarged.

The upper end of chamber 21, i. e., of the enlarged portion of the outer tube 17 is closed in a fluidtight manner by means of a cover 22. The inner tube 16 is substantially shorter than the outer tube 17, thereby providing an annular flow passage over the top of the inner tube 16 and into the chamber 21. In order that the vapor within the chamber 21 be changed continuously, a bleed conduit 23 is provided which extends through the cover 22 of the apparatus. When the present apparatus is used with certain systems, this bleed conduit 23 may be an open end capillary tube of very small diameter. However, since in many systems it has been found that a capillary tube will plug up in a very short time, a bleed tube of larger diameter is preferred which is provided with means for metering the flow of vapor therethrough.

Thus, as shown in Figure 1, the bleed conduit 23 is provided with a pair of solenoid valves 24 and 25 which are alternately opened and closed by means of an electronic leak-rate timer 26 or by any other means such as a motor-driven rotating switch means 26 as shown in Figure 3. In Figure 3 a motor 27 rotates switch 26 to alternately energize the solenoid valve 24 and 25. Referring to Figure 1, as solenoid valve 24 is opened the bleed conduit 23 is placed in communication with a small chamber 28 which is closed at its other end by means of valve 25. After valve 24 has closed, valve 25 is opened allowing the vapor in chamber 28 to be discharged out the vent line 29. By the above-described valve means, the present apparatus is provided with a bleed system which does not become readily clogged while the flow of vapor through said bleed line 23 may be controlled at any constant predetermined rate.

The cover 22 of the apparatus may be provided with a thermometer well 31 extending down into the chamber 21 and containing a thermometer (not shown) of any desired type. Since it is desirable to maintain the liquid in the chamber 21 at a constant level, the present apparatus is provided with suitable liquid level controlling means of any desired type, preferably such as a dielectric or capacitance type liquid level controller 32. A tube or bar 33 forming one electrode of the controller extends through the cover 22 of the apparatus into the chamber 21, the wall of said chamber acting as the other electrode of the controller. The inner electrode 33 is electrically connected to the controller 32 as by means of a shielded or rigid unshielded conductor 34. The inner electrode 33 is insulated from the cover 22 by means of an insulation collar 35 and the outer electrode 16 is grounded through the housing 11.

The liquid level controller is connected to a suitable power source by leads 36 and 37 and is electrically connected to an electrically actuated valve 38 in the discharge line 13 from the apparatus by means of leads 40 and 41. The valve 38 is preferably of the solenoid type. Any change of the liquid level within the chamber 21 will cause a change in capacity between the inner and the outer electrodes, and upon a change in capacity between the electrodes, the liquid level controlled 32 will act to open or close to a greater or lesser extent the valve 38 in the discharge line until the liquid in the chamber 21 returns to its predetermined level. Any slight change in composition of the fluid in chamber 21 is not sufficient to affect the capacitance of the liquid level controller so as to cause a substantial change of the level of liquid therein.

Since it is necessary that the fluid in chamber 21 be maintained at a constant temperature, suitable means are provided for heating the outer tube 17 of the present apparatus, which in turn heats the fluid flowing into the chamber 21. In the apparatus shown in Figure 1, the outer tube 17 is made of stainless steel and a short section thereof acts as a heating element. Fixedly secured to the outer surface of outer tube 17 are two or more electrodes, preferably three ring electrodes 42, 43 and 44, which are electrically connected by leads 45, 46 and 47 to a high current transformer 48. Three electrodes, 42, 43 and 44 are preferably employed so that both ends of the heater tube 17 can be at ground potential with no current flowing through the tube other than at the heated portion between electrodes 42 and 44.

Fixedly secured to the outer tube 17 just below its enlarged upper portion is a temperature-sensing element, such, for example, as a resistance thermometer, to measure the temperature of the fluid in the apparatus just before it enters the chamber 21. The resistance thermometer 50 is electrically connected by leads 51 and 52 to an electronic thermo-regulator 53 which in turn is connected to the high current transformer 48 by leads 54 and 55 for controlling the current output on said transformer 48. The outer tube 17 may be provided with a second temperature-sensing element such as a resistance thermometer 56 which is secured to the tube 17 adjacent the electrodes 42, 43 and 44 and preferably between the upper two electrodes 42 and 43. This second resistance thermometer 56 is electrically connected by leads 57 and 58 to an over-temperature control unit 59 which is in turn electrically connected through leads 61 and 62 to the electronic thermo-regulator 53. Thus, in the event of failure of resistance thermometer 50 or in the event that the annular space 18 between tubes 16 and 17 becomes dry, the over-temperature control unit 59 will cause the electronic thermo-regulator 53 to cut off the current output of the transformer 48.

If desired, the over-temperature control unit 59 may in addition be connected by means of leads 63 and 64 to the dielectric liquid level controller 32. Hence, in the event of excessively high temperatures indicated by resistance thermometer 56, the over-temperature control unit 59, in addition to shutting off current to the heater, would also cause the liquid level controller 32 to open valve 38, thus draining the inner tube 16 and chamber 21 of the present apparatus. The liquid level controller 32, electronic thermo-regulator 53 and the over-temperature control unit 59 are all energized from a suitable source of power, not shown. The apparatus is also provided with a pressure relief valve 65 in a by-pass line 66 around the discharge valve 38. Thus, on any failure of valve 38 to open while pump 14 continues to pump fluid into the present apparatus, there would be no build-up of pressure within the apparatus as the liquid would be discharged out of the discharge conduit 13 and through valve 65 and by-pass line 66 around valve 38.

In order to measure the pressure within the system, the apparatus is provided with suitable pressure measuring means which may be of any desired type and which may be connected at any of several points in the apparatus. As illustrated in Figure 1 of the drawing, an air-actuated pressure transmitter 67 is in communication with the discharge line 13 of the apparatus by means of conduit 68. A supply of air is piped into said pressure transmitter through conduit 70 while the variable signal therefrom is transmitted through conduit 71 to any suitable type of pressure recorder (not shown). Alternatively, the signal from the pressure transmitter 67 may be employed to vary the setting of the valve 90 in a line 91, for example, a butane line running to a gasoline line when the gasoline and butane are being blended within a pipeline. Pressure transmitter 67 is connected to a recorder 92 and if necessary corrections are made to the readings on the recorder to compensate for any slight error caused by the head of liquid in the inner tube 16 of the apparatus. The corrected pressure measurement is then equal to the vapor pressure of the fluid within the chamber 21 of the system.

Instead of employing a pressure transmitter 67 as shown in Figure 1, it may be sufficient in certain systems to employ a simple pressure gauge 72 which is connected by means of a conduit 73 in communication with the chamber 21 of the apparatus shown in Figure 2. Preferably, the other end of the conduit 73 is connected to a flexible bellows unit 74 which is responsive to the pressure within the chamber 21, and the bellows 74 and conduit 73 may be filled with a suitable fluid, thus forming a closed pressure-indicating system. In some cases, the bellows 74 may be dispensed with and the end of the conduit 73 left open. However, this may introduce the possibility of error through condensate collecting in the gauge 72 and on the walls of the conduit 73, which condensate is at times of different composition than the vapor which is present in the chamber 21 when there is a sudden change or variation of fluid composition within the system.

In order to bleed vapors at a constant rate from chamber 21, the apparatus in Figure 2 is provided with a conduit 23 in which a rotary valve 75 is positioned. The rotary valve 73 is rotated at a constant predetermined rate by a motor 76 which is operatively connected to the valve, as shown by means of broken line 77. Rather than mounting the tubes 16 and 17 of Figure 2 in a housing 11 as shown in Figure 1, the lower end of the outer tube 17 is closed in any suitable fluidtight manner as by a plate 94 being welded between tubes 16 and 17. The apparatus shown in Figure 2 is provided with the same heating means as that shown in Figure 1, namely, electrodes 42, 43 and 44 mounted on the outer tube 17 and connected to the high current transformer 48 which is in turn controlled by the electronic thermo-regulator 53 upon receipt of a temperature signal from a resistance thermometer 50. It is realized that other types of heating element could be employed, for example, instead of using electrodes 42, 43 and 44 a heating coil could be wrapped around the outer tube 17. Instead of employing an electrically operated discharge valve 38 as in Figure 1, a float-operated valve 78 is mounted within the inner tube 16 of Figure 2.

The valve 78 is adapted to seat in the aperture 80 of an orifice plate 81 which is mounted in the discharge conduit 13 of the apparatus. Connected to the top of the valve 78 is a thin, elongated rod 82 which extends axially through the inner tube 16. The upper end of the rod 82 is affixed as by welding to a float 83 positioned within chamber 21. Thus, it may be seen that as the liquid in chamber 21 rises, the float 82 positioned therein also rises and raises valve 78 off its seat to allow a greater discharge of fluid from the apparatus, thus maintaining a constant level within chamber 21. In order to maintain the temperature within the chamber 21 constant, chamber 21, that is the enlarged upper portion of the outer tube 17 as well as its cover 22, are preferably enclosed in suitable insulating material.

Referring to Figure 1 of the drawing, the illustrated apparatus operates in the following manner. A stream of fluid, for example gasoline, is drawn or flows through conduit 15 into the pump or flow regulator 14 from whence it is discharged into conduit 12. Since the conduit 12 is in communication with annular space 18 between the inner and outer tubes 16 and 17, respectively, the flow stream is pumped up the annular space 18 into the enlarged portion of said tubes 16 and 17 until it reaches the top of the inner tube 16 which terminates below the cover 22. The incoming fluid then cascades over the upper end of the inner tube 16 around the entire circumference thereof and flows down the inner wall of the tube 16 into the chamber 21. Thus, it may be seen that as the liquid cascades down the inner surface of the inner tube 16, a considerable area of liquid is exposed to the vapor in the chamber 21, the cascading action thus enhancing the vaporization of the liquid within the chamber 21.

As the liquid flows to the bottom of the chamber 21 the level of the fluid therein may be raised slightly thus changing the capacity of the capacitance cell of the level controller 32 that is formed by the rod 35 and the upper part of the inner tube 16. Any change in capacity between the electrodes 35 and 16 is detected by the dielectric liquid level controller 32 which transmits a signal to valve 38 in the discharge line 13, said valve being immediately opened or closed to a greater or lesser extent until the liquid level within chamber 21 has again returned to its predetermined level.

As the liquid flows up the annular space 18 it is heated to a predetermined temperature by a heater unit comprising electrodes 42, 43 and 44. The temperature of the fluid is measured by the temperature-sensing device 50 which, through the electronic thermal regulator 53 and the high current transformer 48, controls the input of heat into the incoming flow stream to maintain said temperature at the desired value. After the heated stream has cascaded over the inner tube 16 to the bottom of the chamber 21, the heated flow stream is discharged down the inner tube 16 and out through the discharge line 13 and discharge valve 38. As the heated stream flows down the inner tube 16, heat is transmitted through the wall of the inner tube 16 below the heating electrodes 42, 43 and 44 to the liquid flowing up the annular space 18 between the inner and outer tubes 16 and 17, respectively.

Thus, the length of the tubes 16 and 17 depends upon the amount of heat that is to be exchanged between the countercurrent flows in tubes 16 and 17 before the flow of fluid in the annular space 18 reaches the heating elements 42, 43 and 44. The temperature of the fluid within the chamber 21 may be set at any desired value, say, at 100° F., or at 140° F., depending upon the test being run by the apparatus. As previously described, variations of pressure within the instrument may be transmitted to a recorder by means of pressure transmitter 67 which is connected by conduits 68 and 13 to the apparatus. Also, as shown in Figure 2, pressure readings may be taken directly from chamber 21 by means of a gauge 72 having a conduit 73 in communication with chamber 21.

Since the chamber 21 is continuously filled with vapors, it is necessary to continuously bleed a small amount of these vapors from the chamber 21 so that any change in composition of the incoming fluid, and hence a change in its vapor pressure, would be rapidly sensed by the instrument. Otherwise, there would be considerable lag in the instrument with regard to sensing changes in the composition of the liquid and any remedial action would be unnecessarily delayed. It is also necessary to bleed continuously a small amount of vapors from chamber 21 so that any evolved non-condensable gas, such as dissolved air in the liquid being discharged into chamber 21, will not be allowed to accumulate. Since, as stated above, small diameter capillary leak tubes plug easily, the enlarged bleed tube 23, Figure 1, having valve means therein for continuously and periodically bleeding the vapor therethrough at a predetermined rate has been found superior for the purpose.

We claim as our invention:

1. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said outer tube extending axially beyond said inner tube and being closed at an upper end, heater means mounted adjacent said outer tube for supplying heat to maintain a liquid therein at a constant predetermined temperature, conduit means in communication with the space in the upper end of said tubes for bleeding vapor therefrom, liquid level control means carried by said apparatus for maintaining the liquid in said inner tube at a constant level, and pressure indicating means in communication with said inner tube for indicating the pressure therein.

2. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said outer tube extending axially beyond said inner tube and being closed at an upper end, heater means mounted adjacent said outer tube for supplying heat thereto, temperature-sensing means mounted on said outer tube for indicating the temperature of the liquid in said annular space, conduit means in communication with the space in the upper ends of said tubes for bleeding vapor therefrom, liquid level control means carried by said apparatus for maintaining the liquid in said inner tube at a constant level, and pressure indicating means in communication with said inner tube for indicating the pressure therein.

3. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said tubes being enlarged in diameter at their upper ends, an annular space being formed between the enlarged ends of said tubes, said outer tube extending axially beyond said inner tube and being closed at an upper end, heater means mounted on said outer tube for supplying heat thereto, temperature-sensing means mounted on said outer tube for indicating the temperature of the liquid in said annular space, conduit means in communication with the enlarged portion of the outer tube for bleeding vapor therefrom, liquid level control means in the enlarged portion of the inner tube for maintaining the liquid therein at a constant level, and pressure indicating means in communication with said inner tube for indicating the pressure therein.

4. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said tubes being enlarged in diameter at their upper ends, an annular space being formed between the enlarged ends of said tubes, said outer tube extending axially beyond said inner tube and being closed at an upper end, said tubes being arranged to permit a counter-current flow of fluid up said annular space between said tubes and down said inner tube, heater means mounted on said outer tube for supplying heat thereto, temperature-sensing means mounted on said outer tube for indicating the temperature of the liquid in said annular space, electrical circuit means interconnecting said heater means and said temperature-sensing means for maintaining a flowing stream of fluid in said annular space at a constant predetermined temperature, conduit means in communication with the enlarged portion of the outer tube for bleeding vapor therefrom, liquid level control means in the enlarged portion of the inner tube for maintaining the liquid therein at a constant level, and pressure indicating means in communication with said inner tube for indicating the pressure therein.

5. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said tubes being enlarged in diameter at their upper ends, an annular space being formed between the enlarged ends of said tubes, said outer tube extending axially beyond said inner tube and being closed at an upper end, said tubes being arranged to permit a counter-current flow of fluid up said annular space between said tubes and down said inner tube, heater means mounted on said outer tube for supplying heat thereto, temperature-sensing means mounted on said outer tube for indicating the temperature of the liquid in said annular space, electrical circuit means interconnecting said heater means and said temperature-sensing means for maintaining a flowing stream of fluid in said annular space at a constant predetermined temperature, conduit means in communication with the enlarged portion of the outer tube for bleeding vapor therefrom, liquid level control means in the enlarged portion of the inner tube, valve means in the lower end of said inner tube actuated by said liquid level control means for maintaining the liquid therein at a constant level, and pressure indicating means in communication with said inner tube for indicating the pressure therein.

6. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said tubes being enlarged in diameter at their upper ends forming a chamber therein with an annular space being formed between the enlarged ends of said tubes, said outer tube extending axially beyond said inner tube and being closed at an upper end, said tubes being arranged to permit a counter-current flow of fluid up said annular space between said tubes and down said inner tube, heater means mounted on said outer tube for supplying heat thereto, temperature-sensing means mounted on said outer tube for indicating the temperature of the liquid in said annular space, electrical circuit means interconnecting said heater means and said temperature-sensing means for maintaining the stream of fluid flowing into said chamber at a constant predetermined temperature, conduit means in communication with said chamber for bleeding vapor therefrom, valve means in said conduit means for continuously bleeding said vapor therethrough at a predetermined rate, electrically-operated liquid level control means in said chamber, electrically-actuated valve means in a discharge line connected to the lower end of said inner tube, said valve means being electrically connected to and actuated by said liquid level control means for maintaining the liquid in said chamber at a constant level, and pressure indicating means in communication with said chamber for indicating the pressure therein.

7. Apparatus for continuously indicating vapor pressure of a liquid comprising an outer vertical tube having inlet means near the lower end thereof, an inner tube mounted in said outer tube forming an annular space sealed at its lower end between said tubes, said annular space being in communication with said inlet means and outlet means in communication with the lower end of said inner tube, said tubes being enlarged in diameter at their upper ends forming a chamber therein with an annular space being formed between the enlarged ends of said tubes, said outer tube extending axially beyond said inner tube and being closed at an upper end, said tubes being arranged to permit a counter-current flow of fluid up said annular space between said tubes and down said inner tube, heater means mounted on said outer tube for supplying heat thereto, temperature-sensing means mounted on said outer tube for indicating the temperature of the liquid in said annular space, electrical circuit means interconnecting said heater means and said temperature-sensing means for maintaining the stream of fluid flowing into said chamber at a constant predetermined temperature, conduit means in communication with said chamber for bleeding vapor therefrom, valve means in said conduit means for continuously bleeding said vapor therethrough at a predetermined rate, a float positioned for vertical movement within said chamber, a float-operated valve positioned in said inner tube at a level below the inlet means to said outer tube, linkage means connecting the float to said float-operated valve to actuate said valve for maintaining the liquid in said chamber at a constant level, and pressure indicating means in communication with said chamber for indicating the pressure therein.

References Cited in the file of this patent

UNITED STATES PATENTS

| 2,002,101 | Valby et al. | May 21, 1935 |
| 2,119,786 | Kallam | June 7, 1938 |
| 2,126,052 | Smith | Aug. 9, 1938 |